United States Patent
Allison

(10) Patent No.: US 11,078,409 B2
(45) Date of Patent: Aug. 3, 2021

(54) ELECTRICALLY CONDUCTIVE PROPPANT COATING AND RELATED METHODS

(71) Applicant: CONOCOPHILLIPS COMPANY, Houston, TX (US)

(72) Inventor: Joe D. Allison, Bartlesville, OK (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 648 days.

(21) Appl. No.: 14/278,124

(22) Filed: May 15, 2014

(65) Prior Publication Data
US 2014/0338898 A1    Nov. 20, 2014

Related U.S. Application Data

(60) Provisional application No. 61/824,811, filed on May 17, 2013.

(51) Int. Cl.
  *E21B 43/267* (2006.01)
  *C09K 8/80* (2006.01)
  *E21B 47/125* (2012.01)

(52) U.S. Cl.
  CPC ............ *C09K 8/805* (2013.01); *E21B 43/267* (2013.01); *E21B 47/125* (2020.05)

(58) Field of Classification Search
  None
  See application file for complete search history.

(56) References Cited

U.S. PATENT DOCUMENTS

| 4,446,433 | A | 5/1984 | Lowell |
| 4,511,843 | A * | 4/1985 | Thoraval ............... G01V 3/30 324/338 |
| 6,725,930 | B2 | 4/2004 | Boney et al. |
| 6,898,529 | B2 | 5/2005 | Gao et al. |
| 7,073,581 | B2 | 7/2006 | Nguyen et al. |
| 7,323,120 | B2 | 1/2008 | Mao et al. |
| 7,597,999 | B2 | 10/2009 | Mao et al. |
| 7,964,240 | B2 | 6/2011 | Carel et al. |
| 2003/0136560 | A1 | 7/2003 | Mese et al. |
| 2003/0205376 | A1 | 11/2003 | Ayoub et al. |
| 2006/0102345 | A1* | 5/2006 | McCarthy ............ C09K 8/805 166/250.1 |
| 2007/0209795 | A1 | 9/2007 | Gupta |
| 2008/0062036 | A1 | 3/2008 | Funk et al. |
| 2008/0283243 | A1 | 11/2008 | Rediger et al. |
| 2009/0087912 | A1 | 4/2009 | Ramos et al. |
| 2010/0038083 | A1 | 2/2010 | Bicerano |
| 2010/0147512 | A1 | 6/2010 | Cramer et al. |
| 2012/0133367 | A1* | 5/2012 | Bittar ................... E21B 43/26 324/346 |

FOREIGN PATENT DOCUMENTS

WO    2007013883 A2    2/2007

OTHER PUBLICATIONS

International Search Report. PCT/US2014/038150. dated Oct. 8, 2014.

* cited by examiner

*Primary Examiner* — Angela M DiTrani Leff
(74) *Attorney, Agent, or Firm* — Polsinelli PC

(57) ABSTRACT

An electrically conductive proppant coating and a method for applying the coating to the proppant, whereby the coated electrically conductive proppant can determine formation characteristics, such as dimensions, orientation, and conductivity.

18 Claims, 1 Drawing Sheet

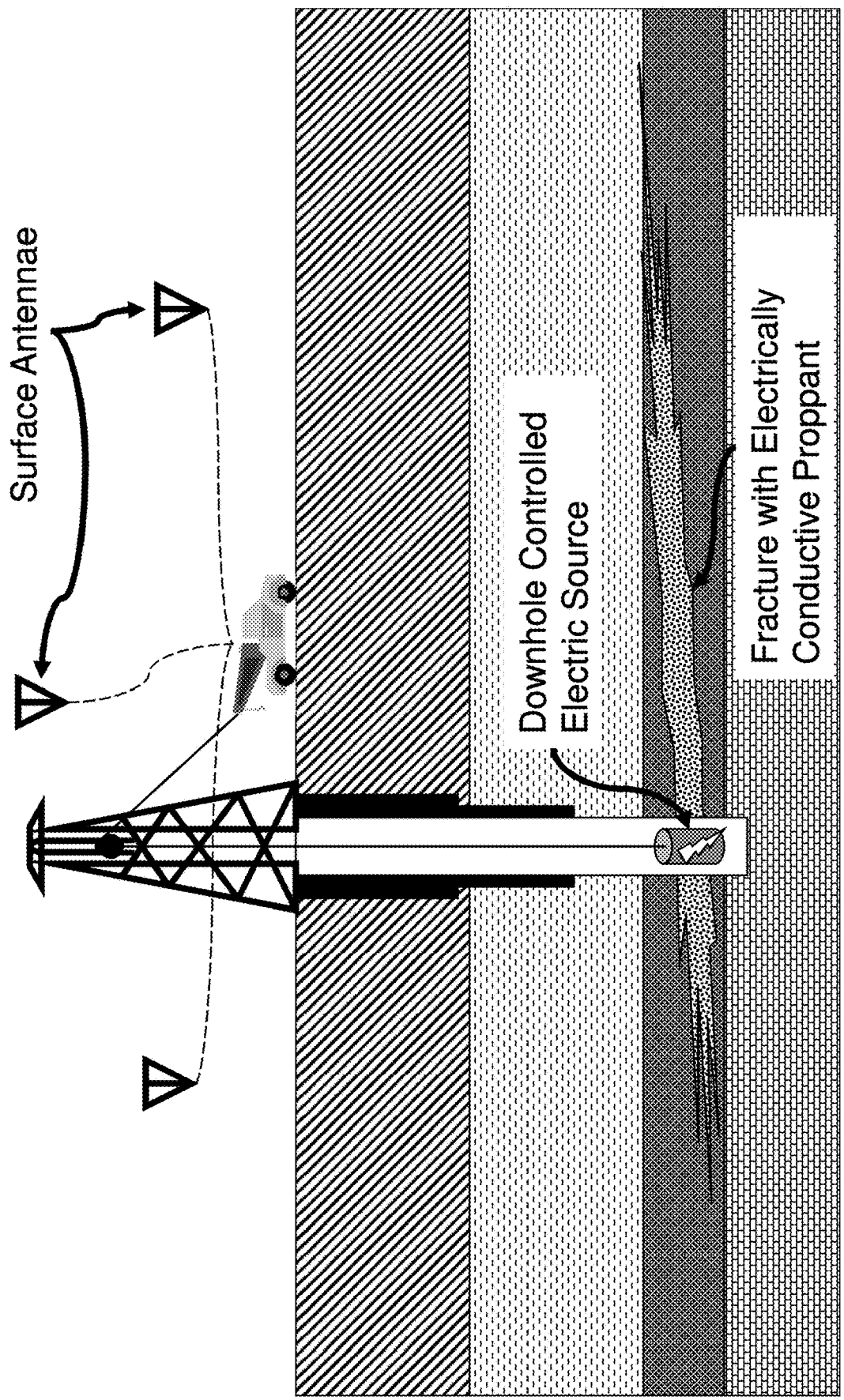

ELECTRICALLY CONDUCTIVE PROPPANT COATING AND RELATED METHODS

CROSS-REFERENCE TO RELATED APPLICATIONS

This application is a non-provisional application which claims benefit under 35 USC § 119(e) of and priority to U.S. Provisional Application Ser. No. 61/824,811 filed 17 May 2013, entitled "ELECTRICALLY CONDUCTIVE PROPPANT COATING AND RELATED METHODS," which is incorporated by reference herein in its entirety.

FIELD OF THE INVENTION

The present disclosure generally relates to an electrically conductive proppant coating and a method for applying the coating to the proppant, whereby the coated electrically conductive proppant can determine formation characteristics, such as dimensions, orientation, and conductivity.

BACKGROUND OF THE INVENTION

Retrieving hydrocarbons from subterranean reservoirs is becoming more difficult, as existing reserves are depleted and production becomes more expensive. It has been estimated that mature fields account for up to 70% of the world's production or more. In order to increase production, reservoirs are often "fractured" through explosions, pressure, heat, and other known methods. The cracks and spaces made after fracturing are filled with sands and small particles to keep the fracture open and allow the flow of hydrocarbons through the proppants. The total amount of fracturing including length, width, and volume of the fractures, size of openings, and penetration into the reservoir are directly related to the flow of hydrocarbons from the fractured reservoir.

It has become common practice to induce higher production rates from low permeability reservoirs by creating fractures via application of hydraulic pressure downhole (aka "frac'ing a well"). These fractures are held open by placing "proppant", commonly sand or other highly permeable, inert material into the fracture. Hydrocarbons (usually gas) can then flow at increased rates to the wellbore via these highly permeable artificial fractures.

Some technologies have tried to determine the extent and position of a fracture using various imaging techniques. For example, William Shuck, U.S. Pat. No. 4,446,433, discloses transmitting and receiving antennae that penetrate the fracture and indicate fracture orientation and length. Funk, et al., US2008062036, measure propped fractures and down-hole formation conditions using radar imaging. Further, McCarthy, et al., WO2007013883, teach introducing a target proppant; transmitting electromagnetic radiation from about 300 megahertz-100 gigahertz; and analyzing a reflected signal from the target particle to determine fracture geometry. Lastly, Nguyen and Fulton, U.S. Pat. No. 7,073,581, describe electroconductive proppant compositions and related methods of obtaining data from a portion of a subterranean formation. Downhole imaging methods that both transmit and receive signals from within the borehole are extremely limited because detection is not separated from the formation. Because downhole detection is nearly linear, variations in the length of the fracture cannot be distinguished. Likewise fluctuations in the depth and width of the fracture will be obscured by downhole detection. Fracture visualization must be improved to assess fractures quickly and inexpensively.

Because aging wells often produce from multiple intervals, some very thin, the ability to place these stimulation treatments with pinpoint accuracy is a key to more effective remediation and increased ultimate recovery. An accurate method of visualizing fracture length, proppant penetration, and estimated flow in the new fracture are required to accurately assess production capabilities and the need for further remediation before production is initiated.

A need exists for an alternative solution to the manufacture and supply of electrically conductive proppant to enable additional fracturing to maximize the areas reached and also ease some concerns that produced fractures do not extent into acquirers.

SUMMARY OF THE INVENTION

In an embodiment, a method for producing an electrically conductive proppant includes: (a) obtaining a proppant; (b) suspending the proppant in a coating material thereby producing a coated proppant, wherein the coating material includes a mixture of carbon residue forming material and a solvent or combination of solvents; (c) stabilizing the coated proppant with an oxidizing agent; (d) subsequently carbonizing the coated proppant; and (e) graphitizing the coated proppant thereafter.

In another embodiment, a method for determining the geometry of a fracture in a subterranean formation includes: (a) injecting a proppant coated with an electrically conductive coating into the fracture thereby producing a coated proppant, wherein the electrically conductive coating includes a coating material wherein the proppant is suspended in the coating material, stabilized with an oxidizing agent, subsequently carbonized and graphitized, wherein the coating material includes a mixture of carbon residue forming material and a solvent or combination of solvents, wherein the carbon residue forming material is petroleum pitch, wherein the solvent or combination of solvents includes is selected from a group consisting of toluene, xylene, quinoline, tetrahydrofuran, tetralin, naphthalene or combinations thereof; (b) charging the coated proppant with an electrical signal; (c) detecting the electrical signal with one or more surface antennae; and (d) determining the geometry of the fracture.

In yet a further embodiment, a method for determining the geometry of a fracture in a subterranean formation includes: (a) injecting a proppant coated with an electrically conductive coating into the fracture thereby producing a coated proppant, wherein the electrically conductive coating includes a coating material wherein the proppant is suspended in the coating material, stabilized with an oxidizing agent, subsequently carbonized and graphitized; (b) charging the coated proppant with an electrical signal; (c) detecting the electrical signal with one or more surface antennae; and (d) determining the geometry of the fracture.

BRIEF DESCRIPTION OF THE DRAWINGS

The invention, together with further advantages thereof, may best be understood by reference to the following description taken in conjunction with the accompanying drawings in which:

FIG. 1 depicts proppant visualization within a subterranean formation, according to one embodiment of the invention.

DETAILED DESCRIPTION OF THE INVENTION

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used in another embodiment to yield a still further embodiment. Thus, it is intended that the present invention cover such modifications and variations that come within the scope of the appended claims and their equivalents.

Proppant is coated with a coating material, transforming the proppant into an electrically conductive proppant. As used herein a "proppant" is a composition of sized particles mixed with fracturing fluid to open and/or hold fractures open during and after a hydraulic fracturing treatment. In addition to naturally occurring sand grains, the sized proppant particles can be man-made or specially engineered particles, such as high-strength ceramic materials like sintered bauxite. Proppant particles are carefully sorted for size and sphericity to provide an efficient conduit for hydrocarbon production to the wellbore.

The coating material includes a mixture of carbon residue forming materials and a solvent or combination of solvents. The carbon residue forming materials may include compounds with a high melting point and a high carbon yield after decomposition. Useful carbon residue forming materials may include heavy aromatic residues from petroleum, chemical process pitches; lignin from pulp industry; phenolic resins, and carbohydrate materials such as sugars and polyacrylonitriles. Petroleum and coal tar pitches, and lignin may also be used as carbon residue forming materials. As used herein, "pitch" refers to a residue derived from pyrolysis of organic material or tar distillation that is solid at room temperature and consists primarily of a complex mixture of aromatic hydrocarbons and heterocyclic compounds.

The carbon residue forming materials may further by any material which can react with an oxidizing agent. Upon reacting with the oxidizing agent, the carbon residue forming material may be thermally decomposed.

The carbon residue forming material is then combined with a solvent or combination of solvents. The solvent should be compatible with the carbon residue forming material. Solvents include pure organic compounds or a mixture of different solvents. The choice of solvent(s) depends on the particular carbon residue forming materials used. Suitable solvents for dissolving the carbon residue forming material include, for example, benzene, toluene, xylene, quinoline, tetrahydrofuran, naphthalene, acetone, cyclohexane, tetrahydronaphthalene, ether, methylpyrrolidinone, etc. When a petroleum or coal tar pitch is used as the carbon residue forming material, for example, solvents such as toluene, xylene, quinoline, tetrahydrofuran, tetralin and naphthalene are preferred.

The mixture of carbon residue forming material and solvent or combination of solvents is then heated to a desired temperature, preferably below the boiling point of the solvent(s). The proppant is then suspended in the mixture causing a certain portion of the coating material to be deposited substantially uniformly on the surface of the proppant.

Upon completion, the coated proppants are separated from the coating material using conventional methods such as, for example, centrifugal separation, or filtration. The coated proppant is then optionally washed with solvent to remove residual pitch (or other carbon forming residue material) solution and dried using conventional methods.

The coated proppant is then stabilized by subjecting the proppant to an oxidizing agent under appropriate reaction conditions. Generally, only mild or moderate conditions are required. The oxidation reaction may be performed by contacting the coated proppant with an oxidizing agent at elevated temperatures or by contacting the coated proppant with an oxidizing agent at mild conditions and activating the oxidizing agent at elevated temperatures.

The coated proppant are subsequently carbonized and then graphitized.

The coated particles can be graphitized by heating them to a still higher elevated temperature. The advantage of graphitization is many-fold, and most significantly the graphitization process frequently allows for the generation of a more-ordered crystal lattice in the coated proppant. Graphitization also removes impurities.

With respect to appropriate graphitization conditions, these are understood to vary according to the specific nature of the carbonized coated proppant. Typically, graphitization occurs in the temperature range of about 200° C.-3,200° C., although lower or higher temperature may also be used in this step. It is required that only satisfactory degree of graphitization be obtained during this step.

Graphitization can immediately follow carbonization, in which case the carbonized coated proppants are retained in a reaction apparatus, i.e., an oven, and the temperature is raised up to an appropriate graphitization temperature. With regard to the rate of this temperature rise, desirably this is maintained in the same rate as used for the carbonization step although, greater or lesser rates of temperature rise can also be utilized depending upon the nature of the carbonized coated proppants.

The electrically conductive coated proppant may then be injected into a subterranean formation. A wireline tool may be run into the formation to the fracture and electrical signal maybe sent into the fracture. Alternatively, the electric signal may be introduced into the fracture from the surface via electrical connections to the casing or the mud pit. Either an AC or reversing DC current maybe used to generate a time-varying signal or pulse. Since the proppant has been coated with an electrically conductive material, the entire fracture (where the proppant is located) may carry the electrical signal and behave like an emitting antenna. One or more surface antenna may detect and record the emitted signal to determine the geometry of the fracture.

In an embodiment, a monitoring station, such as, for example, a truck, backpack, recorder, or transmitter, is set up near the subterranean formation to be fractured. The fracture device and an electromagnetic source are placed in the formation, electromagnetic receivers are dispersed over the fracture area and a background signal is measured. An electrically conductive coated proppant is injected into the fracture and held the fracture open. The fracture is visualized as shown in FIG. 1. In one alternative, the electrically conductive coated proppant is visualized during fracturing.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Pat. No. 7,323,120 (Mao et al.); "Coated Carbonaceous Particles Particularly Useful as Electrode Materials in Electrical Storage Cells, and Methods of Making the Same" (2008).
2. US Publ. No. 2010/0147512 (Cramer et al.); "Controlled Source Fracture Monitoring" (2010).

The invention claimed is:

1. A method for determining geometry of a fracture in a subterranean formation, the method comprising:
    a. injecting a coated proppant into the fracture to cause the fracture to function as an emitting antenna while opening the fracture or holding the fracture open, the coated proppant including a proppant suspended in an electrically-conductive coating, the electrically-conductive coating (i) deposited on a proppant surface of the proppant, (ii) stabilized with an oxidizing agent, and (iii) including a mixture of carbon residue forming material and a solvent, the coated proppant carbonized and graphitized, the carbon residue forming material being petroleum pitch, the solvent being toluene, xylene, quinoline, tetrahydrofuran, tetralin, or naphthalene;
    b. sending, via electrical connections, a time-varying electrical signal into the fracture to charge the coated proppant, the time-varying electrical signal generated at a top surface above the fracture;
    c. detecting, via a plurality of surface antennas at the top surface, the time-varying electrical signal, the plurality of surface antennas spaced from each other over an area above the fracture; and
    d. determining the geometry of the fracture based on the time-varying electrical signal detected by the plurality of surface antennas.

2. The method according to claim 1, wherein the solvent is toluene.

3. The method according to claim 1, wherein the solvent is xylene.

4. The method according to claim 1, wherein the electrically-conductive coating is graphitized immediately after being carbonized.

5. The method according to claim 1, wherein the electrical connections extend from the surface of the fracture to a well casing.

6. The method according to claim 1, wherein the electrical connections extend to a mud pit.

7. The method according to claim 1, wherein the time-varying electrical signal is generated via a reversing DC current.

8. The method according to claim 1, wherein the time-varying electrical signal is generated via an AC current.

9. The method according to claim 1, wherein the detecting the time-varying electrical signal includes recording the time-varying electrical signal.

10. The method according to claim 1, wherein the plurality of surface antennas are spaced from each other over different parts of the fracture.

11. The method according to claim 1, wherein the oxidizing agent is a gaseous oxidizing agent.

12. The method according to claim 11, wherein the gaseous oxidizing agent is selected from a group consisting of oxygen, sulfur fumes, gaseous oxides, nitrogen oxide gas, ambient air, halogens or combinations thereof.

13. A method for determining geometry of a fracture in a subterranean formation, the method comprising:
    a. injecting a coated proppant into the fracture, the coated proppant including a proppant suspended in an electrically-conductive coating material deposited on a surface of the proppant and stabilized with an oxidizing agent, the coated proppant carbonized and graphitized;
    b. sending a time-varying electrical signal into the fracture to charge the coated proppant;
    c. detecting, via a plurality of surface antennas, the time-varying electrical signal, the plurality of surface antennas spaced from each other over an area above the fracture; and
    d. determining the geometry of the fracture based on the time-varying electrical signal detected by the plurality of surface antennas.

14. The method according to claim 13, wherein the coating material includes a mixture of carbon residue forming material and a solvent or combination of solvents.

15. The method according to claim 14, wherein the carbon residue forming material is petroleum pitch.

16. The method according to claim 14, wherein the solvent or combination of solvents is selected from a group consisting of toluene, xylene, quinoline, tetrahydrofuran, tetralin, naphthalene or combinations thereof.

17. The method according to claim 13, wherein the coated proppant is injected into the fracture during creation of the fracture.

18. The method according to claim 13, wherein the plurality of surface antennas are spaced from each other over different parts of the fracture.

* * * * *